United States Patent
Kanakura et al.

(10) Patent No.: US 7,144,605 B2
(45) Date of Patent: Dec. 5, 2006

(54) CURABLE COATING COMPOSITION AND COATING FILM FORMING METHOD

(75) Inventors: Akihiro Kanakura, Hirakata (JP); Takashi Irie, Suita (JP); Hiroto Yoneda, Shijonawate (JP); Hisaki Tanabe, Yawata (JP)

(73) Assignee: Nippon Paint Co., Ltd., Osaka (JP)

( * ) Notice: Subject to any disclaimer, the term of this patent is extended or adjusted under 35 U.S.C. 154(b) by 307 days.

(21) Appl. No.: 10/855,599

(22) Filed: May 28, 2004

(65) Prior Publication Data

US 2004/0219381 A1 Nov. 4, 2004

Related U.S. Application Data

(62) Division of application No. 10/105,272, filed on Mar. 26, 2002, now abandoned.

(30) Foreign Application Priority Data

Mar. 27, 2001 (JP) ............... 2001-091035
Mar. 19, 2002 (JP) ............... 2002-077223

(51) Int. Cl.
*C08F 2/48* (2006.01)
*C08J 3/28* (2006.01)

(52) U.S. Cl. .............. 427/517; 427/515; 427/519; 427/520; 525/107; 525/123; 525/170; 525/176; 525/185; 525/404; 525/438; 525/440; 525/444; 525/445; 525/453; 525/454; 525/455; 525/479; 525/528; 525/531

(58) Field of Classification Search ............ None
See application file for complete search history.

(56) References Cited

U.S. PATENT DOCUMENTS 4,408,018 A 10/1983 Bartman et al.
5,039,720 A 8/1991 Saatweber et al.
5,453,449 A * 9/1995 Drueke et al. ............... 522/6
5,516,453 A * 5/1996 Blankenship ........ 252/183.11
5,565,525 A * 10/1996 Morimoto et al. .......... 525/259
5,567,761 A * 10/1996 Song .......................... 524/523
5,643,977 A * 7/1997 Sho et al. ................... 523/411
5,670,600 A 9/1997 Nienhaus et al.
5,739,230 A * 4/1998 Yuasa et al. ................ 526/217
5,827,928 A * 10/1998 Morimoto et al. .......... 525/217
5,959,028 A * 9/1999 Irie et al. ..................... 525/10

FOREIGN PATENT DOCUMENTS

| DE | 28 31 302 A1 | 2/1979 |
| DE | 37 10431 A1 | 10/1988 |
| EP | 0 160 824 A1 | 11/1985 |
| EP | 0 206 544 A2 | 12/1986 |
| EP | 0 361 048 A1 | 4/1990 |
| EP | 0 365 020 A2 | 4/1990 |
| EP | 0 737 726 A1 | 10/1996 |
| EP | 0 893 456 A1 | 1/1999 |
| GB | 2 009 745 A | 6/1979 |
| GB | 2335196 A * | 9/1999 |
| JP | 8-283657 A * | 10/1996 |
| JP | 10-298495 A * | 11/1998 |
| JP | 10-330690 A * | 12/1998 |
| JP | 11-100477 A * | 4/1999 |
| WO | WO 94/28075 A1 * | 12/1994 |

* cited by examiner

*Primary Examiner*—Robert Sellers
(74) *Attorney, Agent, or Firm*—Sughrue Mion, PLLC

(57) ABSTRACT

A curable coating composition comprises
(a) a component having an active methylene group and/or an active methane group,
(b) a component having a methacrylate group and/or an acrylate group,
(c) a Michael reaction catalyst, and
(d) a photo-polymerization initiator.

19 Claims, No Drawings

CURABLE COATING COMPOSITION AND COATING FILM FORMING METHOD

This is a divisional of application Ser. No. 10/105,272 filed Mar. 26, 2002; now abandoned the disclosure of which is incorporated herein by reference.

TECHNICAL FIELD

The present invention relates to a curable coating composition suitable as a top coating for an automotive and a coating film forming method using the same.

PRIOR ART

Recently, reduction of a volatile organic component (VOC) content in coatings, namely a super high solid coating, is strongly demanded in light of environmental issues. In this case, it is usually necessary to decrease a viscosity of a resin contained in a coating and for this reason, the method has been adopted in which a resin component in the coating is rendered to have low polarity or low molecular weight. However, when the resin component in the coating is rendered to have low polarity or low molecular weight, there arises a workability problem such that sagging tends to occur when it is coated on a vertical surface, for example.

Moreover, improved durability of a coating film such as acid rain resistance and scratch resistance is further demanded, leading to a requirement for a curable system forming intermolecular crosslinkings with stable chemical bonds. In order to improve such durability, it has been generally said useful to form a uniform net structure with a high crosslinking density, thereby imparting a coating film with a toughness.

Japanese Kokai Publication Hei-1-121341, Japanese Kokai Publication Hei-2-500282, Japanese Kokai Publication Hei-4-222879 and others disclose methods in which a Michael reaction is applied to formation of crosslinking in a curable resin composition such as a coating or the like. A Michael reaction makes it possible to crosslink with a stable chemical bond without generating a reaction byproduct since an active methylene group or a hydroxyl group is added to a polarized double bond such as an $\alpha,\beta$-unsaturated carbonyl group. Moreover, the $\alpha,\beta$-unsaturated carbonyl group and the active methylene group have low polarity, therefore these are suitable to increase a solid content of the coating.

However, the $\alpha,\beta$-unsaturated carbonyl group and the active methylene group are tend to be comparatively affected by steric hindrance; therefore, sufficient crosslinking density is hard to be attained by a Michael reaction only. Moreover, since the $\alpha,\beta$-unsaturated carbonyl group is highly reactive, the group, if being remained in a coating film, tends to deteriorate durability performance such as weather resistance.

In addition, the super high solid coating has not reached to a satisfactorily sufficient level in terms of workability such as sagging property.

Therefore, a development has been desired of a coating for an automotive, which is excellent in coating film performance such as durability and scratch resistance and secured with good workability, even if being a super high solid coating using a low-molecular-weight resin, and a coating film forming method.

SUMMARY OF THE INVENTION

It is an object of the present invention to provide a curable coating composition having much less of a volatile organic component, and being excellent in coating film performance such as durability and scratch resistance, and a coating film forming method using the above curable coating composition capable of suppressing generation of sagging and so on.

The present invention is a curable coating composition which comprises (a) a component having an active methylene group and/or an active methine group, (b) a component having a methacrylate group and/or an acrylate group, (c) a Michael reaction catalyst and (d) a photo-polymerization initiator.

The component (a) is preferably at least one species selected from the group consisting of reaction products of polyol with a carboxylic acid compound containing an active methylene group and/or an active methine group and/or a carboxylic acid ester containing an active methylene group and/or an active methine group, reaction products of a polyamine compound with diketene, acrylic resins containing an active methylene group and/or an active methine group and reaction products of an isocyanate compound with a carboxylic acid compound containing an active methylene group and/or a carboxylic acid ester containing an active methylene group.

The component (b) is preferably at least one species selected from the group consisting of (meth)acrylate esters of polyol, unsaturated polyester resins, epoxy(meth)acrylate resins, urethane(meth)acrylate resins, acrylic resins containing an $\alpha,\beta$-unsaturated carbonyl group, polyether(meth)acrylate resins and silicone oligomers containing a (meth)acryloyl group.

The component (c) preferably comprises at least one selected from the group consisting of alkaline metal hydroxides, alkaline metal alkoxides, quaternary ammonium hydroxides, quaternary ammonium carbonates, tertiary amines, guanidine, amidine, and tertiary phosphines.

The component (c) preferably comprises a component (i) having an onium salt.

A cation of the onium salt is preferably at least one selected from the group consisting of quaternary ammonium cations, quaternary phosphonium cations and tertiary sulfonium cations and an anion of the onium salt is preferably at least one selected from the group consisting of halide anions except for an fluoride anion, carboxylate anions, sulfonate anions, sulfate anions, nitrate anions and phosphate anions.

Said component (i) having the onium salt is preferably a resin obtainable by copolymerization of at least one monomer selected from the group consisting of quaternized aminoalkyl (meth)acrylates, quaternized aminoalkyl (meth)acrylamides, quaternary ammonium (meth) acrylates, quaternary phosphinoalkyl (meth)acrylates and quaternary phosphonium (meth)acrylates.

In a case where the component (i) having the onium salt is comprised, it is preferable that the component (c) further comprises a component (ii) having an epoxy group.

The component (ii) having the epoxy group is preferably a glycidyl compound, an alicyclic epoxy compound or an $\alpha$-olefin epoxide.

The component (ii) having the epoxy group is preferably a resin obtainable by copolymerization of at least one monomer selected from the group consisting of glycidyl (meth)acrylates, β-methylglycidyl (meth)acrylates, glycidyl ether of 4-hydroxybutyl(meth)acrylate and (meth)acrylate of 3,4-epoxycyclohexanemethanol.

Moreover, the present invention is directed to a coating film forming method
which comprises a step (1) of applying a curable coating on a substrate to be coated and
a step (2) including a stage of irradiating with ultraviolet ray and a stage of heating,
said curable coating comprising the curable coating composition described above.

Here, the curable coating may be a clear coating and in that case, the substrate in the step (1) may be formed with an uncured base coating film thereon in advance.

DESCRIPTION OF THE PREFERRED EMBODIMENTS

Curable Coating Composition

The component (a) comprised in the curable coating composition of the present invention has two or more active methylene groups and/or active methine groups per one molecule. As such compounds, there can be mentioned reaction products of polyol with a carboxylic acid compound containing an active methylene group and/or an active methine group and/or a carboxylic acid ester containing an active methylene group and/or an active methine group. As the above carboxylic acid compounds and carboxylic acid esters containing active methylene groups, there can be specifically mentioned acetoacetic acid, malonic acid, cyanoacetic acid and derivatives thereof, and esters thereof. Moreover, as the above carboxylic acid compounds and carboxylic acid esters containing active methine groups, there can be mentioned methanetricarboxylic acids, derivatives thereof and alkylesters thereof, which are described in EP No. 0310011. The above active methylene group is preferably a methylene group sandwiched between two carbonyl groups, thereby be in a state of having electrons in excess and being easy to form with a carboanion by releasing a proton. The above active methine group is preferably a methine group surrounded with three carbonyl groups, thereby be in a state of having electrons in excess and being easy to form with a carboanion by releasing a proton.

As polyols described above, there can be mentioned compounds having two or more hydroxyl groups per one molecule, for example, ethylene glycol, diethylene glycol, propylene glycol, tetramethylene glycol, 1,6-hexanediol, neopentyl glycol, trimethylolpropane, glycerin, pentaerythritol, 1,4-cyclohexanedimethanol, 4,4'-isopropylidenedicyclohexanol, bis(hydroxymethyl)tricyclo[5,2,1,0]decane, 1,3, 5-tris(2-hydroxyethyl)cyanuric acid and isopropylidenebis (3,4-cyclohexanediol), and addition products of these polyols with ethylene oxides, propylene oxides and caprolactones and the like. As the above polyols, there can be further mentioned acrylic polyols, polyester polyols, polyether polyols, epoxy polyols, polyurethane polyols, silicone polyols and so on.

Moreover, the component (a) may be a polyester resin having two or more active methylene groups per one molecule obtainable by polycondensation of the above polyol with malonic acid or malonate ester.

As the above component (a), there can also be mentioned reaction products of a polyamine compound with diketen. As the above polyamine compound, there can be mentioned compounds having two or more amino groups per one molecule, for example, ethylenediamine, 1,3-diaminopropane, 1,4-diaminobutane, 1,6-hexanediamine, 1,12-diaminododecane, 1,2-diaminocyclohexane, phenylenediamine, piperazine, 2,6-diaminotoluene, diethyltoluenediamine, N,N'-bis(2-aminopropyl)ethylenediamine, N,N'-bis(3-aminopropyl)-1,3-propanediamine and others.

As the above component (a), there can be further mentioned acrylic resins containing an active methylene group and/or an active methine group. Such resins specifically can be obtained by copolymerization of an acrylic monomer having an active methylene group and/or an active methine group within a molecule with an acrylic monomer having no active methylene group or active methine group within a molecule and/or a non-acrylic monomer. As the above acrylic monomer having an active methylene group and/or an active methine group within a molecule, there can be mentioned 2-acetoacetoxyethyl(meth)acrylate, 2-cyanoacetoxyethyl(meth)acrylate, N-(2-cyanoacetoxyethyl)(meth) acrylamide, N-(2-propionylacetoxybutyl)(meth)acrylamide, N-4-(acetoacetoxymethyl)benzyl(meth)acrylamide, N-(2-acetoacetamidoethyl)(meth)acrylamide, and acrylic monomers having a malonic acid ester on a side chain thereof as disclosed in Japanese Kokai Publication Hei-9-309931. Moreover, as acrylic monomers having no active methylene group or active methine group within a molecule, there can be mentioned methyl, ethyl, propyl, n-butyl, i-butyl, t-butyl, 2-ehtylhexyl, lauryl, phenyl, benzyl, 2-hydroxyethyl, 2-hydroxypropyl or 4-hydroxybutyl of (meth)acrylate, or addition product of 2-hydroxyethyl(meth)acrylate with caprolactone, glycidyl(meth)acrylate, (meth)acrylamide, methylenebis(meth)acrylamide, acrylonitrile and others. As the above non-acrylic monomers, there can be mentioned, for example, styrene, α-methylstyrene, itaconic acid, maleic acid, vinyl acetate and others.

As the above component (a), on the other hand, there can be mentioned reaction products of an isocyanate compound with the above carboxylic acid compound containing an active methylene group and/or the above carboxylic acid ester containing an active methylene group. As the above isocyanate compound, there can be specifically mentioned tolylenediisocyanate, 4,4'-diphenylmethanediisocyanate, xylylenediisocyanate, hexamethylenediisocyanate, lysinediisocyanate, 4,4'-methylenebis(cyclohexylisocyanate), methylcyclohexanediisocyanate, 1,3-(isocyanatemethyl)cyclohexane, isophoronediisocyanate, trimethylhexamethylene diisocyanate and norbornenediisocyanate, and dimers, timers, adducts and the like of these isocyanates.

The above component (a) may comprise a plurality of hydroxyl group and the like in one and the same molecule in addition to the active methylene group and/or the active methine group. These may be used singly or in combination of two or more species. A component having an onium salt or epoxy group in one and the same molecule is categorized not in the component (a) but in the component (c) described later.

As the component (a) comprised in the curable coating composition of the present invention, it is preferably a polyester resin or an acrylic resin from the viewpoint of compatibility with other components.

A number average molecular weight of the component (a) comprised in the curable coating composition of the present invention is, for example, 300 to 10,000, more preferably 500 to 3,000. If the number average molecular weight is less than 300, a hardness of the resulting coating film may become low and curability of the coating may be insufficient, thereby solvent resistance, water resistance and weather resistance of the coating film may possibly deteriorate. On the other hand, if it exceeds 10,000, a viscosity of the component (a) itself becomes high, thereby a content of an organic solvent in the diluted coating upon application may be excessive.

An active hydrogen equivalent of the above component (a) is preferably 40 to 2,000, more preferably 50 to 1,000. If the above active hydrogen equivalent is less than 40, compatibility with other components described hereinafter may decrease and the resulting coating film may possibly be hard and brittle. On the other hand, if it exceeds 2,000, the crosslinking density of the resulting coating film becomes small, thereby physical properties and performance of the coating film may possibly deteriorate. The active hydrogen equivalent in the present specification means a molecular weight per one functional group when a methylene group and a methine group are considered as bifunctional and monofunctional, respectively.

The component (b) comprised in the curable coating composition of the present invention is a compound having two or more methacrylate groups and/or acrylate groups per one molecule, for example, a compound having two or more methacrylate groups and/or acrylate groups having a double bond between α and β carbon atoms in a carbonyl group. As the above component (b), there can be specifically mentioned (meth)acrylate esters of polyols, for example, ethyleneglycol di(meth)acrylate, neopentylglycol di(meth)acrylate, trimethylolpropane tri(meth)acrylate, pentaerythritol tetra(meth)acrylate, dipentaerythritol hexa(meth)acrylate, 1,4-cyclohexyldimethanol di(meth)acrylate, 4,4'-isopropiridenedicyclohexanol di(meth)acrylate, bis(hydroxymethyl)tricyclo[5,2,1,0]decanedi(meth)acrylate, 1,3,5-tris(2-hydroxyethyl)cyanuricacidtri(meth)acrylate and the like, and poly(meth)acrylate resins of acrylic polyols, poly(meth)acrylate resins of polyether polyols, poly(meth) acrylate resins of epoxy polyols, poly(meth)acrylate resins of polyurethane polyols, poly(meth)acrylate resins of silicone polyols and the like, where polyols are described hereinabove referring to the component (a).

As the above component (b), there can be mentioned unsaturated polyesters containing α,β-unsaturated dicarboxylic acid such as fumalic acid, maleic acid or the like. The above unsaturated polyester can be specifically obtained by polycondensation of an acid component comprising a polyhydric carboxylic acid containing an α,β-unsaturated dicarboxylic acid such as maleic anhydride or fumalic acid, with the polyol described hereinabove referring to the component (a).

As the above component (b), there can be further mentioned epoxy(meth)acrylate resins, urethane(meth)acrylate resins, acrylic resins containing an α,β-unsaturated carbonyl group, polyether(meth)acrylate resins, silicone oligomers containing a (meth)acryloyl group and others. The above epoxy(meth)acrylate resin can be obtained by ring opening addition of an epoxy group of an epoxy resin in a bisphenol type, a novolac type or the like, for example, through a reaction with a methacrylic acid or acrylic acid. The above urethane(meth)acrylate resin can be obtained by an addition reaction of 2-hydroxyethyl(meth)acrylate with a polyisocyanate compound such as isophoronediisocyanate, tolylenediisocyanate, diphenylmethanediisocyanate and hexamethylenediisocyanate, or a urethaneprepolymer thereof. Regarding the acrylic resins containing an α,β-unsaturated carbonyl group, an acrylic resin having a (meth)acrylate group on a side chain thereof can be obtained by reacting (meth)acrylic acid to an acrylic resin resulting from copolymerization of a glycidyl(meth)acrylate. Contrary to this, an acrylic monomer containing an epoxy group such as glycidyl(meth)acrylate may be reacted with an acrylic resin containing a carboxyl group. The above polyether(meth)acrylate resin can be obtained, for example, by reacting 2-(meth)acryloyloxyethylisocyanate to a polyether having a hydroxyl group at a terminal thereof. As the above silicone oligomer containing a (meth)acryloyl group, there can be mentioned, for example, polyorganosiloxanes having 3-(meth)acryloyloxypropyl groups at both terminals thereof and the like.

The above component (b) can have a plurality of hydroxyl group and the like in addition to a methacrylate group and/or an acrylate group. These may be used singly or in combination of two or more kinds. A component having an epoxy group in one and the same molecule is not categorized into the component (b), but in the component (ii) described hereinafter.

As the component (b) comprised in the curable coating composition of the present invention, (meth) acrylate esters of polyols are preferable from the view point of industrial availability.

A number average molecular weight of the component (b) comprised in the curable coating composition of the present invention is, for example, 200 to 10,000, preferably 300 to 3,000. If the above number average molecular weight is less than 200, the composition is evaporated away in heat curing after application, a hardness of the resulting coating film is decreased, or curability of the coating becomes insufficient, whereby solvent resistance, water resistance and weather resistance of the coating film may possibly deteriorate. On the other hand, if it exceeds 10,000, a viscosity of the component (b) itself becomes high and a content of an organic solvent in the diluted coating upon application may become excessive.

A double bond equivalent of the above component (b) is preferably 100 to 1,500, more preferably 100 to 1,000. If the double bond equivalent is less than 100, unreacted (meth)acrylate groups remain in the resulting coating film, whereby weather resistance of the coating film may deteriorate and the resulting coating film may possibly be hard and brittle. If it exceeds 1,500, a crosslinking density of the resulting coating film becomes small, thereby physical properties and performance of the coating film may possibly deteriorate. The double bond equivalent used in the present specification means a molecular weight per one double bond.

In the curable coating composition of the present invention, a ratio of an active hydrogen equivalent of the above component (a)/a double bond equivalent of the above component (b) is determined by a proportion at which two reactions be carried out, namely a radical polymerization reaction of double bonds by ultraviolet ray curing and a Michael reaction in which an active methylene or an active methine is added to (meth)acrylate by heat curing. Thus, when a radical polymerization is used as a main curing reaction, a ratio of an active hydrogen equivalent of the above component (a)/a double bond equivalent of the above component (b) is preferably 1.0 or less and more preferably 0.5 or less. Contrary to this, when a Michael reaction is used as a main curing reaction, the above ratio is preferably 0.3 to 3.0, more preferably 0.5 to 2.0. Such an incorporated ratio is finally determined by workability and a quality of a coating film and is not particularly restricted in the present invention. The above active hydrogen equivalent can be determined from a solid weight/the above active hydrogen equivalent of the above component (a) in the coating composition and the double bond equivalent is determined from a solid weight/the double bond equivalent of the above component (b) in the coating composition.

The component (c) comprised in the curable coating composition of the present invention is a Michael reaction catalyst. This is required in order that two carbonyl groups adjacent to methylene (methine) increase an acidity of protons in methylene (methine) to produce an enolate anion. The above component (c) is at least one selected from the group consisting of alkaline metal hydroxides, such as sodium hydroxide and potassium hydroxide; alkaline metal alkoxides such as sodium methoxide and potassium ethoxide; quaternary ammonium hydroxides such as tetrabutylammonium hydroxide and benzyltrimethyammonium hydroxide; quaternary ammonium carbonates such as tetrabutylammonium carbonate and benzyltrimethylammonium carbonate; quaternary ammonium fluorides such as tetrabutylammonium fluoride and benzyltrimethylammonium fluoride; quaternary ammonium tetrahydroborates such as tetrabutylammonium tetrahydroborate and benzyltrimethylammonium tetrahydroborate; tetramethylguanidine; tertiary amines such as 1,8-diazabicyclo[5,4,0]undecene-7 and diazabicyclo[4,3,0]nonene-5; guanidine and amidine; and tertiary phosphines such as triphenylphosphine.

The above component (c) can comprise a component (i) having an onium salt. As a cationic moiety of the onium salt which the above component (i) has, there can be specifically mentioned quaternary ammonium cations such as tetrabutylammonium cation, tetramethylammonium cation, tetrapropylammonium cation, tetrahexylammonium cation, tetraoctylammonium cation, tetradecylammonium cation, tetrahexadecylammonium cation, triethylhexylammonium cation, 2-hydroxylethyltrimethylammonium (choline) cation, methyltrioctylammoniumcation, cetyltrimethylammoniumcation, 2-chloroethyltrimethylammonium cation and methylpyridinium cation; quaternary phosphonium cations such as tetrabutylphosphonium cation; and tertiary sulfonium cations such as trimethylsulfonium cation, etc. The quaternary ammonium cation that can be industrially available in variety of species is preferred.

Moreover, an anion moiety specifically includes halide anions except for a fluoride anion such as chloride anion, bromide anion, iodide anion; carboxylate anions such as benzoate anion, salicylate anion, maleate anion and phthalate anion; sulfonate anions such as methanesulfonate anion, p-toluenesulfonate anion and dodecylbenzenesulfonate anion; sulfate anions such as sulfate anion and methosulfate anion; nitrate anions; and phosphate anions such as phosphate anion and di-t-butyl phosphate anion. From the viewpoint of curability, the above halide anion and carboxylate anion are preferred.

As the component (i) having the onium salt, there can be specifically mentioned compounds containing onium salts, such as tetrabutylammonium chloride, tetraethylammonium bromide, diethyldibutylammonium chloride, octyltrimethyl bromide, dioctyldimethylammonium salicylate, benzyllauryldimethylammonium chloride, 2-hydroxyethyltrimethylammonium chloride, tetraethylphosphoniumchloride, tetraethylphosphoniumbromide, tetrabutylphosphonium chloride and trimethylphosphonium chloride, etc.

As the above component (i), there can also be mentioned a resin having an onium salt obtainable by copolymerization of an acrylic monomer having the above onium salt within a molecule with the other acrylic monomer and/or a non-acrylic monomer. As such acrylic monomers having the above onium salt within a molecule, there can be mentioned, for example, quaternized aminoalkyl(meth)acrylates such as 2-(methacryloyloxy)ethyltrimethylammonium chloride and 2-(methacryloyloxy)ethyltrimethylammonium bromide; quaternized aminoalkyl(meth)acrylamides such as methacryloylaminopropyl trimethylammonium chloride and methacryloylaminopropyltrimethylammonium bromide; quaternary ammonium(meth)acrylates such as tetrabutylammonium(meth)acrylate and trimethylbenzylammonium (meth)acrylate; quaternary phosphinoalkyl(meth)acrylates such as methacryloyloxyethyltrimethylammonium dimethylphosphate; and quaternary phosphonium(meth)acrylates such as trioctyl(4-vinylbenzyl)phophonium chloride, tri-n-butyl(2-methacryloyloxyethyl)phophonium chloride, 2-acidphosphoxyethylmethacrylate ditetrabutylammomnium salt, tri-n-butylmethacryloyloxyethylphophonium chloride and tri-n-octyl-4-vinylbenzylphosphonium chloride.

Moreover, as other acrylic monomers and non-acrylic monomers described above, which are compounds having no onium salt, there can be specifically mentioned those having no onium salt among acrylic monomers having an active methylene group and/or an active methine group within a molecule and other acrylic monomers and non-acrylic monomers, which are described hereinabove referring to the component (a).

The above component (i) may be one obtainable, for example, by addition reaction of an acrylic monomer having the above onium salt within a molecule to the above component (a).

The above component (c) thus obtained can have a plurality of active methylene group, active methine group, (meth)acrylate group, hydroxyl group and the like in one and the same molecule in addition to the onium salt. These may be used singly or in combination of two or more species.

Moreover, as the above component (i), there can be mentioned a non-aqueous dispersion composed of a solution of a resin dissolved in an organic solvent and a resin particles insoluble in the above organic solvent obtainable by copolymerization of an acrylic monomer having the above onium salt with the other acrylic monomer and non-acrylic monomer as described above.

Such a non-aqueous dispersion can be obtained, for example, by carrying out solution polymerization of an acrylic monomer having the above onium salt with a mixed monomer solution composed of the other acrylic monomer and non-acrylic monomer as described above in a solution of a resin dissolved in an organic solvent. The above organic solvent is not particularly restricted and includes, for example, known solvents such as aliphatic hydrocarbon solvents, aromatic hydrocarbon solvents, petroleum mixed solvents, alcohol solvents, ether solvents, ketone solvents, ester solvents and so on. These may be used singly or in combination of two or more species.

Resins dissolved in the above organic solvent are not particularly restricted and include acrylic resins obtainable by a common process of copolymerization of acrylic and/or non-acrylic monomers, polyester resins obtainable by a common process of polycondensation of an acidic component such as a polyhydric carboxylic acid with an alcohol component such as polyol, and alkyd resins obtainable by modification thereof with a fatty acid, an oil component or the like.

As the above acrylic monomer, there can be specifically mentioned acrylic monomers having an active methylene group and/or an active methine group within a molecule, other acrylic monomers and non-acrylic monomers, which are mentioned hereinabove referring to the component (a).

Referring to the above resins, the above acrylic monomer is preferably the acrylic monomer having no onium salt from the viewpoint of the storage stability.

Moreover, as the above polyhydric carboxylic acids, there can be specifically mentioned adipic acid, phthalic acid, maleic acid and sebacic acid, and anhydrides thereof, and as the above polyols, there can be specifically mentioned those described hereinabove referring to the component (b). Further, the above fatty acids include oleic acid, linolenic acid, stearyl acid and the like, and the above oil components include castor oil, linseed oil, coconut oil and the like.

The above non-aqueous dispersion is one obtainable, for example, by a common process of solution polymerization of an acrylic monomer having the above onium salt with a mixed monomer solution composed of the other acrylic monomer and non-acrylic monomer in the resin solution resulting from dissolving the above resin into the above organic solvent.

In the curable coating composition of the present invention, the amount of the component (c) or the component (i) as a monomer or an onium salt is preferably 0.01 to 10% by equivalent, more preferably 0.05 to 5% by equivalent relative to the total of the equivalent of an active methylene group and an active methine group of the component (a) and the equivalent of a methacrylate group and an acrylate group of the component (b). If the amount is less than 0.01% by equivalent, a catalyst concentration is excessively low, whereby a curing reaction may not proceed sufficiently, while if in excess of 10% by equivalent, it becomes difficult to uniformly mix the catalyst into the resin composition due to its hydrophilicity, and water resistance, moisture resistance and other performances of a cured coating film may possibly deteriorate.

In a case where the component (c) contained in the curable coating composition of the present invention comprises the above component (i) having the onium salt, it is preferable that the component (c) further comprises a component (ii) having an epoxy group. By including the above component (ii) having the epoxy group, it can function as a reaction catalyst in cooperation with the above component (i).

As the above component (ii) having the epoxy group, there can be mentioned, for example, glycidyl compounds such as phenylglycidyl ether, bisphenol epoxy resin, a reaction product of epichlorohydrin with polyol, glycidyl bezonate, glycidyl (meth)acrylate; alicyclic epoxy compounds such as 4-(3,4-epoxycyclohexyl)methoxycarbonyl-1,2-epoxycyclohexane and 3,4-epoxycyclohexane methanol; and α-olefine epoxides such as epoxyhexadecane.

In addition, there can be mentioned as the above component (ii), resins having an epoxy group on a side chain thereof obtainable by copolymerization of an acrylic monomer having an epoxy group within a molecule and/or an acrylic monomer having a five-membered cyclic carbonate group within a molecule with the other acrylic monomer and/or a non-acrylic monomer. As such acrylic monomer having the epoxy group within a molecule, there can be mentioned, for example, glycidyl(meth)acrylate, β-methylglycidyl(meth)acrylate, glycidyl ether of 4-hydroxybutyl (meth)acrylate and (meth)acrylate of 3,4-epoxycyclohexane methanol.

Moreover, as the other acrylic monomer and non-acrylic monomer described above, which are compounds having no epoxy group, there can specifically mentioned those having no epoxy group among acrylic monomers having an active methylene group and/or an active methine group within a molecule and other acrylic monomers and non-acrylic monomers, which are described hereinabove referring to the component (a).

The above component (ii) may be a compound obtainable by addition reaction of epichlorohydrin to the polyol described hereinabove referring to the component (a).

Moreover, as the above component (ii), there can be mentioned, for example, a non-aqueous dispersion obtainable by a common process of solution polymerization of the above acrylic monomer having an epoxy group with a mixed monomer solution composed of the other acrylic monomer and a non-acrylic monomer in a solution of a resin dissolved in an organic solvent. The above organic solvent and the resin dissolved thereto are not particularly restricted, but specifically include those described hereinabove referring to the non-aqueous dispersion in the above component (i).

Referring to the above resin, an acrylic monomer having no epoxy group is preferred from the viewpoint of storage stability.

The above non-aqueous dispersion can be obtained by a common process of solution polymerization of the above acrylic monomer having an epoxy group with a mixed monomer solution composed of the other acrylic monomer and a non-acrylic monomer in a resin solution resulting from dissolving the above resin in the above organic solvent.

The above non-aqueous dispersion thus obtained can have a plurality of active methylene group, active methine group, (meth)acrylate group, hydroxyl group and the like in one and the same molecule in addition to the epoxy group.

The above component (ii) thus obtained can have a plurality of active methylene group, active methine group, (meth)acrylate group or hydroxyl group on one and the same molecule in addition to the epoxy group. These may be used singly or in combination of two or more species.

In the curable coating composition of the present invention, in a case where the above component (c) comprises the above component (i), an amount of the above component (ii) as an epoxy group is preferably 1 to 30 equivalents, more preferably 3 to 20 equivalents relative to the onium salt of the above component (i). If it is less than 1 equivalent, the concentration of the epoxy group as a promoter is too low to proceed curing reaction sufficiently, while exceeding 30 equivalents, unreacted epoxy groups remain after curing to thereby deteriorate a durability quality such as chemical resistance and weather resistance.

As the compound (d) photo-polymerization initiator comprised in the curable coating composition of the present invention, known compounds can be used. For example, it includes benzoins and benzoin alkylethers such as benzoin, benzoin methylether, benzoin ethylether and benzoin propylether; acetphenones such as acetophenone, 2,2-dimethoxy-2-phenylacetophenone, 2,2-diethoxy-2-phenylacetophenone, 1,1-dichloroacetophenone; aminoacetophenones such as 2-methyl-1-[4-(methylthio)phenyl]-2-morpholinopropanone-1,2-benzyl-2-dimethylamino-1-(4-morpholinophenyl)-butanone-1,N,N-dimethylaminoacetophenone; anthraquinones such as 2-methylanthraquinone, 2-ethylanthraquinone, 2-tert-butylanthraquinone, 1-chloroanthraquinone; thioxanthones such as 2,4-dimethyl thioxanthone, 2,4-diethyl thioxanthone, 2-chloro thioxanthone and 2,4-diisopropyl thioxanthone; ketals such as acetophenone dimethylketal and benzyl methylketal; benzophenones or xanthones such as benzophenone and 4,4'-bisdiethylaminobenzophenone; 2,4,6-trimethylbenzoyldiphenylphosphineoxide; iodonium salts, sulfonium salts and diazonium salts of aromatic compounds; and polysilane compounds. These may be used in combination of two or more species, and photo-polymerization co-initiators such as tertiary amines e.g. triethanolamine and ethyl dimethylaminobenzoate can be used in combination.

The amount of photo-polymerization initiator, the component (d), in the curable coating composition of the present invention is not specifically limited but set properly according to the proportion of reactions between ultraviolet ray curing and heat curing. Moreover, the amount of a component (d) can be adjusted according to a required level of weather resistance, and according to a species and an amount of the ultraviolet absorber component described hereinafter. The amount of the above component (d) in the curable coating composition of the invention is generally, for example, from 0.01 to 10% by weight relative to the total weight of the above component (a), the above component (b) and the above component (c). The curable coating composition of the present invention can comprise an organic solvent, an additive and so on which are well known to those skilled in the art according to need in addition to the above components. As the above organic solvents, there can specifically be mentioned those described herein above referring to the non-aqueous dispersion of the component (i).

The additive is not particularly restricted and includes benzophenone-based and triazole-based ultraviolet absorbers; hindered amine-based and other light stabilizers; phenol-based, phosphorus-based and other antioxidants; silicone-based, acrylic-based and other surface-treatment agents; silicone-based, fluoride-based and other antifoaming agents; special resin-based and other pigment dispersants; nonionic-based, ionic-based and other antistatic agents; and mixtures thereof.

Especially, in a case where an ultraviolet absorber is comprised in the coating composition for the purpose to improve weather resistance of the coating film, it is necessary to control a species and a content of the ultraviolet absorber within a range where no insufficient curing may occur under irradiation with ultraviolet ray described hereinafter. Japanese Kokai Publication Hei-7-18245 discloses the method which comprises temporarily blocking a phenolic hydroxyl group of an ultraviolet absorber. As still another method, the method which comprises using a sensitizer functionalizing with an activation energy in a wavelength region different from that absorbed by an ultraviolet absorber is commonly used.

The curable coating composition of the present invention can further comprise a color pigment and an extender pigment. As the above color pigments, there can be mentioned, for example, in organic pigments such iron oxide, lead oxide, titanium dioxide, carbon black, coal dust, cadmium yellow, cadmium red, chromium yellow and the like; and organic pigments such as phthalocyanine blue, phthalocyanine green, calbazole violet, anthrapyridine, azo orange, flavanthrone yellow, isoindoline yellow, azo yellow, indanthrone blue, dibromanzusrone red, perylene red, azo red, anthraquinone red and quinacridone red, etc. As the above extender pigments, there can be mentioned, for example, talc, barium sulfate and the like.

In a case where the curable coating composition of the present invention is used as a clear coating, the above color pigment may be contained to the extent at which transparency is not lost.

A solid content of the curable coating composition of the present invention is preferably 50% by weight or more, more preferably 70 to 95% by weight upon application. If it is less than 50% by weight, the amount of a volatile organic component becomes high, thereby satisfactory effect for the recent environmental issues may not be obtained. A preparation method of the above curable coating composition is not particularly restricted, but may be carried out by stirring and mixing the respective components described above by means of a stirrer or the like.

Coating Film Forming Method

The coating film forming method of the present invention comprises a step (1) of applying a curable coating on a substrate to be coated and a step (2) including a stage of irradiating with ultraviolet ray and a stage of heating, said curable coating comprising the above curable coating composition. As the above substrate to be coated, there can be mentioned metal materials such as iron, steel, aluminum, tin, zinc and others and alloys and casts containing these and plastic materials, and preferred are bodies and parts of automotives such as automobiles, trucks, motor bicycles and buses. These may be subjected to a surface treatment in advance, or formed with an undercoating film by applying an undercoating such as anionic electrodeposition coating and cationic electrodeposition coating.

The viscosity of the above curable coating upon application can be properly adjusted using the above organic solvent according to an application method.

The coating film forming method of the present invention is first to coat the above curable coating on the substrate to be coated as the step (1). The application method described above is not particularly restricted and includes, for example, brush coating, roller coating, air spray coating, air-less spray coating, dipping, flow-coating and the like, and especially in a case where substrates to be coated are a body or parts of an automotive, preferred are an air spray electrostatic coating method and a rotary atomizing electrostatic coating method.

A solid content of the curable coating upon application is preferably 50% by weight or more, more preferably 60% by weight or more from the viewpoint of reduction of organic solvent evaporated away upon application and heating.

A thickness of a coating film is not particularly limited, but can be properly set according to an application of the resulting coated article.

The above curable coating may be a clear coating. In that case, from the viewpoint of a design, uncured base coating film is preferably formed on the above article to be coated in advance. The uncured base coating film mentioned above can be obtained by applying a base coating on the substrate to be coated. It is generally called a wet-on-wet coating method to apply a clear coating on the uncured base coating film as in this case.

The above base coating is not particularly restricted and specifically includes coatings which comprise a coating film forming component composed of a coating film forming resin such as acrylic resin, polyester resin, epoxy resin, urethane resin or the like with a curing agent suitable for a curable functional group contained in the coating film forming resin and a color component such as the color pigment described above and a luster-color pigment, for example aluminum powder, alumina powder, bronze powder, copper powder, tin powder, zinc powder, iron phosphide, metal coating mica powder, titanium dioxide coating mica powder, titanium dioxide coating glass powder or the like. As the configuration of the base coating, there can be mentioned those well known by those skilled in the art such as an organic solvent-borne, a water-borne or the like. As methods for applying the above base coating, there can be specifically mentioned methods of applying the above curable coating.

A film thickness of the base coating is preferably 10 to 60 µm, more preferably 20 to 50 µm in dry film thickness. If the above film thickness is less than 10 µm, a substrate cannot be covered sufficiently, while exceeding 60 µm, inconveniences such as foaming or sagging may possibly occur upon application.

In a case where the base coating described above is water-borne, a preheating step is preferably performed on the uncured base coating film obtained. The above preheating step is not to cure the uncured base coating film, but to evaporate a way moisture contained. Such a preheating step is carried out, for example, by leaving or drying the uncured coating film at a temperature from room temperature to about 110° C. for 3 to 10 min.

The coating film forming method of the present invention is to carry out, as the subsequent step (2), curing including a stage of irradiating with ultraviolet ray and a stage of heating. The above stage of irradiating with ultraviolet ray is to cause a component having a methacrylate group and/or an acrylate group, which the component (b), to be cured by a radical polymerization reaction and, more specifically, it is the stage to irradiate using a carbon arc lamp, a mercury vapor lamp, a xenon lamp, a fluorescent lamp, an argon glow discharge or the like as an ultraviolet ray irradiation source for a certain period of time. The irradiation intensity and irradiation time can be properly set according to species of the respective components in the coating.

Further, the stage of heating is to cause curing through a Michael reaction of components (a) and (b) and, more specifically, the conventional heating method can be adopted as it is. A heating temperature and a heating time are properly set by those skilled in the art, and generally the heating temperature is 80 to 200° C., more preferably 100 to 180° C. and the heating time is 10 to 40 min.

The above stage of irradiating with ultraviolet ray and the stage of heating may be carried out simultaneously or sequentially, and there is no specific limitation in the order of the stages, however, in the step (2), it is important to perform both of the above stages therein. For example, in a case where workability such as sagging property is to be improved, or in a case where an appearance of the coating film obtained by wet-on-wet coating is to be improved, it is preferable to perform the two stages simultaneously or the stage of irradiating with ultraviolet ray ahead of the stage of heating. On the other hand, for improving durability of the coating film such as acid resistance and scratch resistance or for improving repairability such as polishability, it is preferable to perform the stage of heating ahead of the stage of irradiating with ultraviolet ray.

The curable coating composition of the present invention, which has components described above, can make it possible to reduce the content of a volatile organic component to the lowest level. Moreover, since both of ultraviolet ray irradiation and heating are combinedly used, even if the coating composition contains much of such low molecular weight components, it has a good curability and excellent sagging property.

EXAMPLES

The following Examples describe the present invention in more detail. However, they are by no means limitative for the scope of the present invention. The term "part" or "parts" in the following description means "part by weight" or "parts by weight."

Production Example 1

Preparation of Acrylic Resin (a-1) Solution

Into a flask equipped with a condenser, a stirring device, a thermometer, a dropping funnel and a nitrogen inlet tube, 45 parts of Solvesso 100 (aromatic hydrocarbon organic solvent made by Esso Co.) and 45 parts of n-butanol were charged and the mixture was heated to 120° C. and held at the temperature. Then, a monomer mixed solution composed of 70 parts of 2-(methoxymalonyloxy)ethylmethacrylate, 25 parts of methylmethacrylate, 20parts of styrene and 10 parts of Kayaester O (t-butylperoxyoctate made by Kayaku Akzo K.K.) was added dropwise thereto over 3 hours, followed by aging for 0.5 hour. Moreover, a mixed solution composed of 1 part of Kayaester O, parts of Solvesso 100 and 5 parts of n-butanol was added dropwise thereto over 0.5 hour, followed by aging for 1.5 hours. Thereafter, 48 parts of the solvent was distilled off under reduced pressure to obtain an acrylic resin (a-1) solution. A solid content of the obtained acrylic resin solution was 64.2% by weight, a number average molecular weight as measured by GPC (gel permeation chromatography) was 2,460 and an active hydrogen equivalent was 164.

Production Example 2

Preparation of Acrylic Resin (a-2) Solution

Into an apparatus similar to Production Example 1, 55 parts of n-butanol was charged and a monomer mixed solution composed of 50 parts 2-(methoxymalonyloxy)ethyl methacrylate, 20 parts of styrene, 15 parts of cyclohexylmethacrylate, 10 parts of α-methylstyrenedimer and 8 parts of Kayaester O and a monomer mixed solution composed of 5 parts of 2-(methacryloyloxy)ethyltrimethylammonium chloride and 10 parts of n-butanol were simultaneously added dropwise thereto at 118° C. over 3 hours. Thereafter, the mixture was aged for 0.5 hour. Moreover, 0.8 part of Kayaester O/10 parts of n-butanol were mixed and thus obtained mixture was added dropwise at 118° C. over 0.5 hour, followed by aging for 1.5 hours. Thereafter, 13 parts of the solvent was distilled off under reduced pressure to obtain an acrylic resin (a-2) solution. A solid content of the obtained acrylic resin solution was 65.6% by weight, a number average molecular weight as measured by GPC was 1,540 and an active hydrogen equivalent was 230.

Production Example 3

Preparation of Acrylic Resin (a-3) Solution

Into an apparatus similar to Production Example 1, 49.5 parts of Solvesso 100 and 5.5 parts of n-butanol were charged and a monomer mixed solution composed of 45 parts of 2-(methoxymalonyloxy)ethyl methacrylate, 10 parts of styrene, 35 parts of glycidyl methacrylate, 10 parts of α-methylstyrenedimer and 8 parts of Kayaester O was added dropwise thereto at 120° C. over 3 hours, followed by aging for 0.5 hour. Moreover, 0.8 part of Kayaester O/9parts of Solvesso 100 and 1 part of n-butanol were mixed and thus obtained mixture was added dropwise at 120° C. over 0.5 hour, followed by aging for 1.5hours. Thereafter, 13 parts of the solvent was distilled off under reduced pressure to obtain an acrylic resin (a-3) solution. A solid content of the obtained acrylic resin solution was 64.7% by weight, a number average molecular weight as measured by GPC was 1,850 and an active hydrogen equivalent was 255.

Production Example 4

Preparation of Polyester Resin (a-4) Solution

Into a flask equipped with a condenser, a solvent recovery device, a stirrer, a thermometer and a nitrogen inlet tube, 54.5 parts of 4,4'-isopropylidenedicyclohexanol and 150 parts of dimethylmalonate were charged and the mixture was heated to 120 to 130° C.

The mixture was gradually heated to 150 to 180° C. while distilling off methanol produced in a transesterification reaction. After 14.5 parts of methanol was distilled off, 90 parts of unreacted dimethyl malonate was recovered by distillation under reduced pressure. After cooling down to about 50° C., 17.6 parts of propyleneglycolmonomethylether acetate was added to obtain a polyester resin (a-4) solution. A solid content of the obtained polyester resin solution was 85.7% by weight, a number average molecular weight as measured by GPC was 660 and an active hydrogen equivalent was 110.

Production Example 5

Preparation of Solution of Acrylic Resin (b) Having an Acrylate Group

Into an apparatus similar to Production Example 1, 55 parts of xylene was charged and a mixed solution composed of 55 parts of n-butyl methacrylate, 10 parts of styrene, 25 parts of glycidylmethacrylate, 10 parts of α-methylstyrenedimer and 8 parts of Kayaester O (t-butylperoxyoctate)/10 parts of xylene was added dropwise thereto at 130° C. over 3 hours. Then, the mixture was aged for 0.5 hour. Further, 1 part of Kayaester O (t-butylperoxyoctate)/10 parts of xylene were mixed and thus obtained mixture was added dropwise at 130° C. over 0.5 hour, followed by aging for 1.5 hours. Thereafter, 13 parts of the solvent was distilled off under reduced pressure to obtain acrylic resin solution. A solid content of the obtained acrylic resin solution was 64.7% by weight and a number average molecular weight as measured by GPC was 2,230.

In order to introduce an acrylate group, 12 parts of acrylic acid and 0.05 part of hydroquinone were added to 155 parts of the acrylic resin (100 parts as a resin solid content) obtained above and a reaction was allowed to proceed at 120° C. until an acid value became 1 or less to obtain a solution of an acrylic resin (b) having an acrylate group which had a solid content of 67.1% and a double bond equivalent of 672.

Production Example 6

Preparation of Non-aqueous Dispersion (i) Having an Onium Salt

Into an apparatus similar to Production Example 1, 30 parts of n-butyl acetate was charged and heated to 110° C. in a nitrogen stream while stirring. A mixture composed of 18 parts of 2-acetoacetoxyethyl methacrylate, 25 parts of 2-ethylhexyl methacrylate, 7 parts of styrene and 3 parts of Kayaester O (t-butylperoxyoctate) as a polymerization initiator was added dropwise thereto over 3 hours at a constant speed. After the dropping, the mixture was held at the same temperature for 1 hour and then, 3 parts of n-butyl acetate and 0.3 part of Kayaester O (t-butylperoxyoctate) were added and the mixture was held at the same temperature for 2 hours. A number average molecular weight of the resin obtained at this time point was 7,300.

Further, after 34 parts of n-butyl acetate was added to the mixture, a mixture composed of 5 parts of 2-(methacryloyloxy)ethyltrimethylammonium chloride, 25 parts of methyl methacrylate, 20 parts of 2-hydroxyethyl methacrylate and 0.8 part of Kayaester O was added dropwise thereto over 3 hours at a constant speed. After the dropping, the mixture was held at the same temperature for 1 hour and then, 0.08 part of Kayaester O was added and the mixture was held at the same temperature for 1 hour, followed by cooling to obtain a non-aqueous dispersion (i) having an onium salt in milk white color. A solid content of thus obtained dispersion was 60.7% by weight and a viscosity was 3,400 mPa·s.

Production Example 7

Preparation of Non-aqueous Dispersion (ii) Having an Epoxy Group

Into an apparatus similar to Production Example 1, 20 parts of n-butyl acetate was charged and heated to 110° C. in a nitrogen stream while stirring. A mixture composed of 10 parts of 2-acetoacetoxyethyl methacrylate, 20 parts of 2-ethylhexyl methacrylate and 3 parts of Kayaester O was added dropwise thereto over 3 hours at a constant speed. After the dropping, the mixture was held at the same temperature for 1 hour and then, 3 parts of n-butyl acetate and 0.3 part of Kayaester O were added and the mixture was held at the same temperature for 2 hours. A number average molecular weight of a resin obtained at this time point was 4,400.

Further, after 27 parts of n-butyl acetate and 20 parts of n-octane were added to the mixture, a mixture composed of 25 parts of methyl methacrylate, 15 parts of 2-hydroxyethyl methacrylate, 30 parts of glycidyl methacrylate and 0.8 part of Kayaester O was added dropwise thereto over 3 hours at a constant speed. After the dropping, the mixture was held at the same temperature for 1 hour, and then 0.08 part of Kayaester O was added and the mixture was held at the same temperature for 1 hour, followed by cooling to obtain a non-aqueous dispersion (ii) having an epoxy group in milk white color. A solid content of thus obtained dispersion was 60.5% by weight and a viscosity was 460 mPa·s.

Production Example 8

Preparation of Water-Borne Acrylic Resin

Into a flask equipped with devices similar to Production Example 1, 23.9 parts of dipropyleneglycol methyl ether and 16.1 parts of propyleneglycol methyl ether were charged, heated to 120° C. and held at that temperature, and then, a monomer mixed solution composed of 54.5 parts of ethyl acrylate, 12.5 parts of methyl methacrylate, 14.7 parts of 2-hydroxyethyl acrylate, 10.0 parts of styrene and 8.5 parts of methacrylic acid and a mixed solution composed of 10.0 parts of dipropyleneglycolmethyl ether and 2.0 parts of Kayaester O were added dropwise simultaneously thereto over 3 hours, followed by aging for 0.5 hour. Further, a mixed solution composed of 0.3 part of Kayaester O and 5.0 parts of dipropyleneglycol methyl ether was added dropwise over 5 hours, followed by aging for 1 hour. Thereafter, 16.1 parts of the solvent was distilled off under reduced pressure and then dimethylethanolamine and ion exchange water were added to obtain a water-borne acrylic resin having a number average molecular weight of 10,000 as measured by GPC, a solid content of 31% by weight, a solid acid value of 56 and a hydroxyl value of 70.

Production Example 9

Preparation of Pigment Paste

After 100 parts of the water-borne acrylic resin obtained in Production Example 8, 28.9 parts of ion exchange water, 0.3 part of dimethylaminoethanol, and 5.1 parts of Degussa carbon FW-285 (carbon black made by Degussa AG) were preliminarily mixed, the mixture was dispersed in a paint conditioner with glass beads added thereto at room temperature for 1 hour to obtain a pigment paste having a particle size of 5 μm or less.

Production Example 10

Preparation of Water-Borne Base Coating

A water-borne base coating was obtained by mixing 118.8 parts of the water-borne acrylic resin obtained in Production Example 8, 134.3 parts of the pigment paste obtained in Production Example 9, 29.1 parts of Cymel 204 (melamine resin made by Mitsui Cytec K.K., solid content 80% by weight) and 161.3 parts of ion exchange water.

Example 1

An additive solution was obtained by mixing 2 parts of Chinubin 384 (ultraviolet absorber made by Ciba Geigy Co. Ltd. ), 4 parts of Sanol LS-292 (optical stabilizer made by Sankyo K.K. ), 2 parts of an acrylic surface adjusting agent made by Nippon Paint Co., Ltd. (solid content 50% by weight) and 10 parts of an organic fine particles made by Nippon Paint Co., Ltd. (solid content 25% by weight).

In a disper, 154 parts of the acrylic resin (a-1) solution obtained in Production Example 1, 60 parts of pentaerithritol triacrylate, 2.3 parts of tetrabutylammonium acetate and 4.9 parts of Irgacure 1700 (photo-polymerization initiator made by Ciba Specialty Chemicals Co.) were stirred and mixed until uniformly mixed, and thereafter, the additive solution obtained was added to the mixture and stirred to obtain a curable coating composition. Thus-obtained curable coating composition was diluted with n-butyl acetate so as to attain a viscosity of 30 sec with No. 4 Ford cup (at 20° C.).

This curable coating composition was air-spray coated onto a polypropylene panel to a dry film thickness of 40 μm. The coated panel was preheated at 60° C. for 5 min, then irradiated with ultraviolet ray using an 80 W/cm high pressure mercury lamp (collective, ozone generation type) in conditions of a conveyor speed of 3 m/min and a distance of 10 cm and thereafter, the panel was heated at 140° C. for 25 minutes. A coating film was peeled off from the propylene panel to obtain a free film.

Moreover, the water-borne base coating obtained in Production Example 10 was air-spray coated onto the intermediate coated substrate of 100 mm in length×300 mm in width, having 10 holes of 5 mm in diameter arranged at equidistant in one row in a width direction so as to attain a dry film thickness of 16 μm, then the substrate was heated at 80° C. for 3 min. Thereafter, the above diluted curable coating composition was air-spray coated thereon so as to attain a slope of a dry film thickness of 20 to 60 μm across and then the substrate was set such that the coated surface was vertical relative to the ground surface.

The intermediate coated substrate was prepared by treating a dull steel panel of 0.8 mm thick with zinc phosphate, carrying out electrodeposition coating with Power top U-50 (cationic electrodeposition coating made by Nippon Paint Co., Ltd.) to a dry film thickness of 25 μm, carrying out heat curing at 160° C. for 30 min. to obtain an electrodeposited coating film, and carrying out an air-spray coating with Olga P-2 (polyester based solvent-borne intermediate coating made by Nippon Paint Co., Ltd.) to a dry film thickness of 40 μm, followed by heat curing at 140° C. for 30 min.

Thus set substrate was preheated at 60° C. for 5 min and then irradiated with ultraviolet ray using an 80 W/cm high pressure mercury lamp (collective, ozone generation type) in conditions of a conveyor speed of 3 m/min and a distance of 10 cm, and then the substrate was positioned such that the coated surface was vertical relative to the ground surface and, heated at 140° C. for 25 min to cure and a test panel was obtained.

Examples 2 to 9

According to compositions shown in Table 1, curable coatings were prepared in a manner similar to Example 1 and free films and test panels were further obtained.

Example 10

In a disper, 117 parts of the polyester resin (a-4) solution obtained in Production Example 4, 90 parts of pentaerythritol triacrylate, 3.2 parts of tetrabutylammonium chloride, 72 parts of the acrylic resin (a-3) solution obtained in Production Example 3 and 7.2 parts of Ilgacure 1700 were stirred and mixed until uniformly mixed, and further, the additive solution obtained in Example 1 was added to the mixture and stirred to obtain a curable coating composition. Thus obtained curable coating composition was diluted with n-butyl acetate so as to attain a viscosity of 30 sec with No. 4 Ford cup (at 20° C.).

This curable coating composition was air-spray coated onto a polypropylene panel to a dry film thickness of 40 μm. This panel was heated at 140° C. for 25 min, then irradiated with ultraviolet ray using an 80 W/cm high pressure mercury lamp (a collective, ozone generation type) in conditions of a conveyor speed of 3 m/min and a distance of 10 cm, and then a coating film was peeled off from the propylene panel to obtain a free film.

Moreover, the water-borne base coating obtained in Production Example 10 was air-spray coated onto the intermediate coated substrate obtained in Example 1 to a dry film thickness of 16 μm, then the substrate was heated at 80° C. for 3 min, thereafter the above diluted curable coating composition was air-spray coated thereon so as to attain a slope of a dry film thickness of 20 to 60 μm across and then the substrate was set such that a coated surface was vertical relative to the ground surface.

Thereafter, the substrate positioned vertical to the ground surface was heated at 140° C. for 25 min and then irradiated with ultraviolet ray to cure using an 80 W/cm high pressure mercury lamp in conditions of a conveyor speed of 3 m/min and a distance of 10 cm and a test panel was obtained.

Examples 11 and 12

Curable coatings were prepared in a manner similar to that of Example 10 according to the respective compositions shown in Table 2 and further free films and test panels were obtained.

Comparative Example 1

A free film and test panel were obtained in a manner similar to that of Example 6 with the exception that only ultraviolet ray irradiation was performed without heating.

Comparative Example 2

A free films and test panel were obtained in a manner similar to that of Example 6 with the exception that only heating was performed without ultraviolet ray irradiation.

Comparative Examples 3 and 4

Free films and test panels were obtained in a manner similar to that of Examples 8 and 11 respectively, with the exception that only heating was performed without ultraviolet ray irradiation.

Evaluation Tests

The following evaluation tests were performed on curable coating compositions, free films and test panels obtained. Results obtained are shown in Tables 1 to 3.

(Solid Content of the Coatings)

Each of diluted curable coating compositions obtained in Examples 1 to 12 and Comparative Examples 1 to 3 was weighed by 1 gram and each coating was dried at 110° C. for 1 hour to measure a solid content of the coating. The solid content of 50% by weight or more were judged as acceptable.

(Sagging)

A film thickness at a hole portion having a sag of 5 mm or more downward was measured in each of obtained test panels. The test panels having a sag of 35 μm or more were judged as acceptable.

(Crosslinking Desnsity)

A crosslinking density of each of obtained free-films was measured with Vibron DDV-II-EA type (kinetic viscoelasticity meter made by Toyo Baldwin K.K., test conditions: frequency 11 Hz, temperature rise speed 2° C./min). A crosslinking density of $1.0 \times 10^{-3}$ mol/cc or more was judged as acceptable.

(Pencil Hardness)

A pencil hardness was measured in conformity of JIS K 5600-5-4 at a portion with a dry film thickness of 40 μm of a curable coating composition on each of obtained test panels. A pencil hardness of HB or higher was judged as acceptable.

(Acid Resistance)

After 0.5 ml of a 0.1-N aqueous sulfuric acid solution was placed on a test panel, the test panel was heated in an oven kept at an inside temperature of 50° C. for 2 hours, followed by cleaning with wafer, and then water on the surfaces thereof was swept off with waste cloths. An etching depth was measured at each of the positions where the acid was placed by Surfcom 110 (two-dimensional surface roughness meter made by Tokyo Seimitsu K.K.). The evaluation criteria were defined as follows:

○: 0 μm
Δ: 0 to 0.5 μm
X: above 0.5 μm (Scratch Resistance)

A flannel cloth of 2×2 cm applied with 1 g of a 50% aqueous dispersion of New Homing cleanser (87% polishing agent and 5% surfactant, made by Kao Co.) was applied on a JSPS-type color fastness tester (made by Daiei Kagaku Seiki K.K.) and thereafter a test panel was rubbed with the cloth back and forth for 100 times with a 500-g load. A gloss retention at 20 degrees before and after the rubbing was measured using a glossimeter (made by Suga Shikenki K.K.). Gloss retention of 50% or more was judged as acceptable.

TABLE 1

| | | Ex. | | | | | |
|---|---|---|---|---|---|---|---|
| | | 1 | 2 | 3 | 4 | 5 | 6 |
| Composition | Component (a) | Production Ex. 1 154 | Production Ex. 1 154 | Production Ex. 1 154 | Porduction Ex. 4 117 | Production Ex. 4 117 | Production Ex. 4 117 |
| | Component (b) | PETA 60 | PETA 60 | PETA 60 | PETA 90 | DTTA 706 | PETA 90 |
| | Component (c) | TBAA 2.3 | TBAC 2.1 | Production Ex. 2 48 Production Ex. 3 48 | TBAC 3.2 | Production Ex. 2 72 Production Ex. 3 71 | Production Ex. 6 78 Production Ex. 7 89 |
| | | | EHD 6.0 | | Production Ex. 3 72 | | |
| | Component (d) | Ir-1700 4.9 | Ir-1700 5.8 | Ir-1700 6.0 | Ir-1700 7.2 | Ir-1700 9.0 | Ir-1700 8.7 |
| Evaluation result | Solid content of diluted coating composition (wt %) | 69 | 68 | 68 | 80 | 76 | 72 |
| | Sagging (μm) | 42 | 47 | 45 | 44 | 48 | 51 |
| | Crosslinking density (×10⁻³ mol/cc) | 3.8 | 3.8 | 3.5 | 4.4 | 4.1 | 3.8 |

TABLE 1-continued

|  | | Ex. | | | | | |
|---|---|---|---|---|---|---|---|
|  | | 1 | 2 | 3 | 4 | 5 | 6 |
| | Pencil hardness | 4H | 3H | 2H | 4H | 3H | 4H |
| | Acid resistance | ○ | ○ | ○ | ○ | ○ | ○ |
| | Scratch resistance (%) | 80 | 65 | 63 | 72 | 70 | 69 |

PETA: pentaerythritol triacrylate,
TBAA: tetrabutylammonium acetate,
TBAC: tetrabutylammonium chloride,
EHD: 1,2-epoxyhexadecane
DTTA: ditrimethylolpropane tetraacrylate,
Ir-1700: Ilgacure 1700 (photo-polymerization initiator made by Ciba Specialty Chemicals Co.)

TABLE 2

|  |  | Ex. | | | | | |
|---|---|---|---|---|---|---|---|
|  |  | 7 | 8 | 9 | 10 | 11 | 12 |
| Composition | Component (a) | Production Ex. 4 117 | Production Ex. 4 117 | Production Ex. 4 117 | Production Ex. 4 117 | Production Ex. 4 117 | Production Ex. 4 117 |
| | Component (b) | Production Ex. 5 910 | PETA 113 | PETA 90 | PETA 90 | PETA 113 | PETA 90 |
| | Component (c) | Production Ex. 6 78 | Production Ex. 6 78 | Production Ex. 6 78 | TBAC 3.2 | Production Ex. 6 55 | Production Ex. 6 55 |
| | | Production Ex. 7 89 | Production Ex. 7 89 | Production Ex. 7 89 | Production Ex. 3 72 | Production Ex. 7 110 | Production Ex. 7 110 |
| | Component (d) | Ir-1700 24 | Ir-1700 9.4 | TPO 87 Benzophenone 5.8 | Ir-1700 7.2 | Ir-1700 9.4 | TPO 8.7 Benzophenone 5.8 |
| Evaluation result | Solid content of diluted coating composition (wt %) | 63 | 74 | 72 | 80 | 74 | 72 |
| | Sagging (μm) | 54 | 48 | 51 | 40 | 42 | 44 |
| | Crosslinking density (×10$^{-3}$ mol/cc) | 2.7 | 4.7 | 3.8 | 4.1 | 4.2 | 3.3 |
| | Pencil hardness | 2H | 5H | 3H | 2H | 2H | H |
| | Acid resistance | ○ | ○ | ○ | ○ | ○ | ○ |
| | Scratch resistance (%) | 58 | 74 | 71 | 83 | 89 | 88 |

PETA: pentaerythritol triacrylate,
TBAC: tetrabutylammonium chloride,
Ir-1700: Ilgacure 1700 (photo-polymerization initiator made by Ciba Specialty Chemicals Co.)
TPO: Lucirin TPO (photo-polymerization initiator made by BASF Ak.)

TABLE 3

|  |  | Compar. Ex. | | | |
|---|---|---|---|---|---|
|  |  | 1 | 2 | 3 | 4 |
| Composition | Component (a) | Production Ex. 4 117 | Production Ex. 4 117 | Production Ex. 4 117 | Production Ex. 4 117 |
| | Component (b) | PETA 90 | PETA 90 | PETA 113 | PETA 113 |
| | Component (c) | Production Ex. 6 78 | Production Ex. 6 78 | Production Ex. 6 78 | Production Ex. 6 55 |
| | | Production Ex. 7 89 | Production Ex. 7 89 | Production Ex. 7 89 | Production Ex. 7 110 |
| | Component (d) | Ir-1700 8.7 | Ir-1700 8.7 | Ir-1700 9.4 | Ir-1700 9.4 |
| Evaluation result | diluted coating composition (wt %) | 72 | 72 | 74 | 74 |
| | Sagging (μm) | — | 34 | 28 | 42 |
| | Crosslinking density (×10$^{-3}$ mol/cc) | — | 1.2 | 1 | 1.8 |
| | Pencil hardness | HB | B | B | B |

TABLE 3-continued

|  | Compar. Ex. | | | |
| --- | --- | --- | --- | --- |
|  | 1 | 2 | 3 | 4 |
| Acid resistance | X | Δ | X | X |
| Scratch resistance (%) | 38 | 33 | 8 | 21 |

PETA: pentaerythritol triacrylate,
Ir-1700: Ilgacure 1700 (photo-polymerization initiator made by Ciba Specialty Chemicals Co.)

As is clear from results in Tables 1 to 3, a volatile organic component in the curable coating composition of the present invention was very small. Moreover, the curable coating composition of the present invention could not only be improved on its sagging property but also become excellent in acid resistance and scratch resistance on the resulting coating film by using both of ultraviolet ray irradiation and heating after application.

The invention claimed is:

1. A coating film forming method
which comprises a step (1) of applying a curable coating on a substrate to be coated and
a step (2) including a stage of heating ahead of a stage of irradiating with ultraviolet ray, said curable coating comprising the curable coating which comprises (a) a component having two or more active methylene and/or active methine groups, (b) a component having two or more methacrylate and/or acrylate groups per one molecule, (c) a Michael reaction catalyst and (d) a photo-polymerizaton initiator.

2. The coating film forming method according to claim 1, wherein said curable coating is a clear coating.

3. The coating film forming method according to claim 2, wherein the substrate in said step (1) is formed with an uncured base coating film thereon in advance.

4. The coating film forming method according to claim 1, wherein said component (a) is at least one species selected from the group consisting of reaction products of polyol with a carboxylic acid compound containing an active methylene group and/or an active methine group and/or a carboxylic acid ester containing an active methylene group and/or an active methine group, reaction products of a polyamine compound with diketene, acrylic resins containing an active methylene group/or an active methine group and reaction products of an isocyanate compound with a carboxylic acid compound containing an active methylene group and/or a carboxylic acid ester containing an active methylene group.

5. The coating film forming method according to claim 1, wherein said component (b) is at least one species selected from the group consisting of (meth)acrylate esters of polyol, unsaturated polyester resins, epoxy(meth)acrylate resins, urethane(meth)acrylate resins, acrylic resins containing an α,β-unsaturated carbonyl group, polyether(meth)acrylate resins and silicone oligomers containing a (meth)acryloyl group.

6. The coating film forming method according to claim 1, wherein said component (c) comprises at least one selected from the group consisting of alkaline metal hydroxides, alkaline metal alkoxides, quaternary ammonium hydroxides, quaternary ammonium carbonates, tertiary amines, guanidine, amidine, and tertiary phosphines.

7. The coating film forming method according to claim 1, wherein said component (c) comprises a component (i) having an onium salt.

8. The coating film forming method according to claim 7, wherein a cation of said onium salt is at least one selected from the group consisting of quaternary ammonium cations, quaternary phosphonium cations and tertiary sulfonium cations, and an anion of said onium salt is at least one selected from the group consisting of halide anions except for fluoride anions, carboxylate anions, sulfonate anions, sulfate anions, nitrate anions and phosphate anions.

9. The coating film forming method according to claim 7, wherein said component (i) having the onium salt is a resin obtained by copolymerization of at least one monomer selected from the group consisting of quaternized aminoalkyl(meth)acrylates, quaternized amonoalkyl(meth)acrylamides, quaternary ammonium(meth)acrylates, quaternary phosphinoalkyl(meth)acrylates and quaternary phosphonium(meth)acrylates.

10. The coating film forming method according to claim 7, wherein said component (c) comprises a component (ii) having an epoxy group.

11. The coating film forming method according to claim 10, wherein said component (ii) having the epoxy group is a glycidyl compound, an alicyclic epoxy compound or an α-olefin epoxide.

12. The coating film forming method according to claim 10, wherein said component (ii) having the epoxy group is a resin obtained by copolymerization of at least one monomer selected from the group consisting of glycidyl(meth)acrylates, β-methylglycidyl(meth)acrylates, glycidyl ether of 4-hydroxybutyl(meth)acrylate and (meth)acrylate of 3,4-epoxycyclohexanemethanol.

13. The coating film forming method according to claim 4, wherein said component (b) is at least one species selected from the, group consisting of (meth)acrylate esters of polyol, unsaturated polyester resins, epoxy(meth)acrylate resins, urethane(meth)acrylate resins, acrylic resins containing an α,β-unsaturated carbonyl group, polyester(meth)acrylate resins and silicone oligomers containing a (meth)acryloyl group.

14. The coating film forming method according to claim 4, wherein said component (c) comprises at least one selected from the group consisting of alkaline metal hydroxides, alkaline metal alkoxides, quaternary ammonium hydroxides, quaternary ammonium carbonates, tertiary amines, guanidine, amidine, and-tertiary phosphines.

15. The coating film forming method according to claim 5, wherein said component (c) comprises at least one selected from the group consisting of alkaline metal hydroxides, alkaline metal alkoxides, quaternary ammonium hydroxides, quaternary ammonium carbonates, tertiary amines, guanidine, amidine, and tertiary phosphines.

16. The coating film forming method according to claim 4, wherein said component (c) comprises a component (i) having an onium salt.

17. The coating film forming method according to claim 5, wherein said component (c) comprises a component (i) having an onium salt.

18. The coating film forming method according to claim 16, wherein a cation of said onium salt is at least one selected from the group consisting of quaternary ammonium cations, quaternary phosphonium cations and tertiary sulfonium cations, and an anion of said onium salt is at least one selected from the group consisting of halide anions except for an fluoride anion, carboxylate anions, sulfonate anions, sulfate anions, nitrate anions and phosphate anions.

19. The coating film forming method according to claim 17, wherein a cation of said onium salt is at least one selected from the group consisting of quaternary ammonium cations, quaternary phosphonium cations and tertiary sulfonium cations, and an anion of said onium salt is at least one selected from the group consisting of halide anions except for an fluoride anion, carboxylate anions, sulfonate anions, sulfate anions, nitrate anions and phosphate anions.

* * * * *